United States Patent [19]
Reichel et al.

[11] Patent Number: 4,690,204
[45] Date of Patent: Sep. 1, 1987

[54] AIR INLET CHANNEL FOR A CHARGING AIR INTERCOOLER

[75] Inventors: Anton Reichel, Ditzingen; Bernard Lohmann, Loeningen; Eugen Kolb, Stuttgart; Manfred Hochkönig, Moeglingen; Hermann Burst, Rutesheim; Helmut Kretschmer, Waldaschaff, all of Fed. Rep. of Germany

[73] Assignee: Dr. Ing. h.c.F. Porsche Aktiengesellschaft, Fed. Rep. of Germany

[21] Appl. No.: 779,044

[22] Filed: Sep. 23, 1985

[30] Foreign Application Priority Data

Sep. 22, 1984 [DE] Fed. Rep. of Germany ....... 8427918

[51] Int. Cl.⁴ .............................................. B60K 13/02
[52] U.S. Cl. ..................... 165/44; 123/41.62; 180/68.1; 180/68.3; 180/68.4
[58] Field of Search ............................. 165/41, 44, 51; 123/41.6, 41.62; 180/68.7, 68.3, 68.4

[56] References Cited

U.S. PATENT DOCUMENTS

| | | | |
|---|---|---|---|
| 2,033,731 | 3/1936 | Nallinger | 180/68.3 |
| 2,050,451 | 8/1936 | Nallinger | 180/68.1 |
| 2,146,120 | 2/1939 | Ingildsen | 180/68.1 |
| 2,197,503 | 4/1940 | Martin | 180/68.3 |
| 2,581,072 | 1/1952 | Brezek | 180/68.1 |
| 3,205,964 | 9/1965 | Henry-Biabaud | 180/68.1 |
| 3,520,283 | 7/1970 | Forstner et al. | 123/41.62 |
| 4,566,407 | 1/1986 | Petee | 180/68.4 |

FOREIGN PATENT DOCUMENTS

| | | | |
|---|---|---|---|
| 1214511 | 4/1960 | France | 180/68.1 |
| 1373936 | 8/1964 | France | 180/68.1 |
| 0957352 | 2/1980 | France | 180/68.1 |
| 0424874 | 3/1935 | United Kingdom | 180/68.3 |
| 0719518 | 12/1954 | United Kingdom | 180/68.1 |
| 1158860 | 7/1969 | United Kingdom | 180/68.1 |

Primary Examiner—Albert W. Davis, Jr.
Assistant Examiner—John K. Ford

[57] ABSTRACT

An air supply channel for a charging air intercooler of an exhaust gas turbocharger of an internal combustion engine arranged in the rear of a vehicle, in which the air supply channel is arranged within the fender area of the vehicle and includes an air inlet and an air discharge opening; the channel includes a tubular element which is constructed trumpet-shaped and is retained in the wheel casing above the rear wheel; at its air inlet side, the channel is connected with an inlet connection fixed at the body by way of a connecting sleeve and at its air discharge side with the charging air intercooler.

15 Claims, 7 Drawing Figures

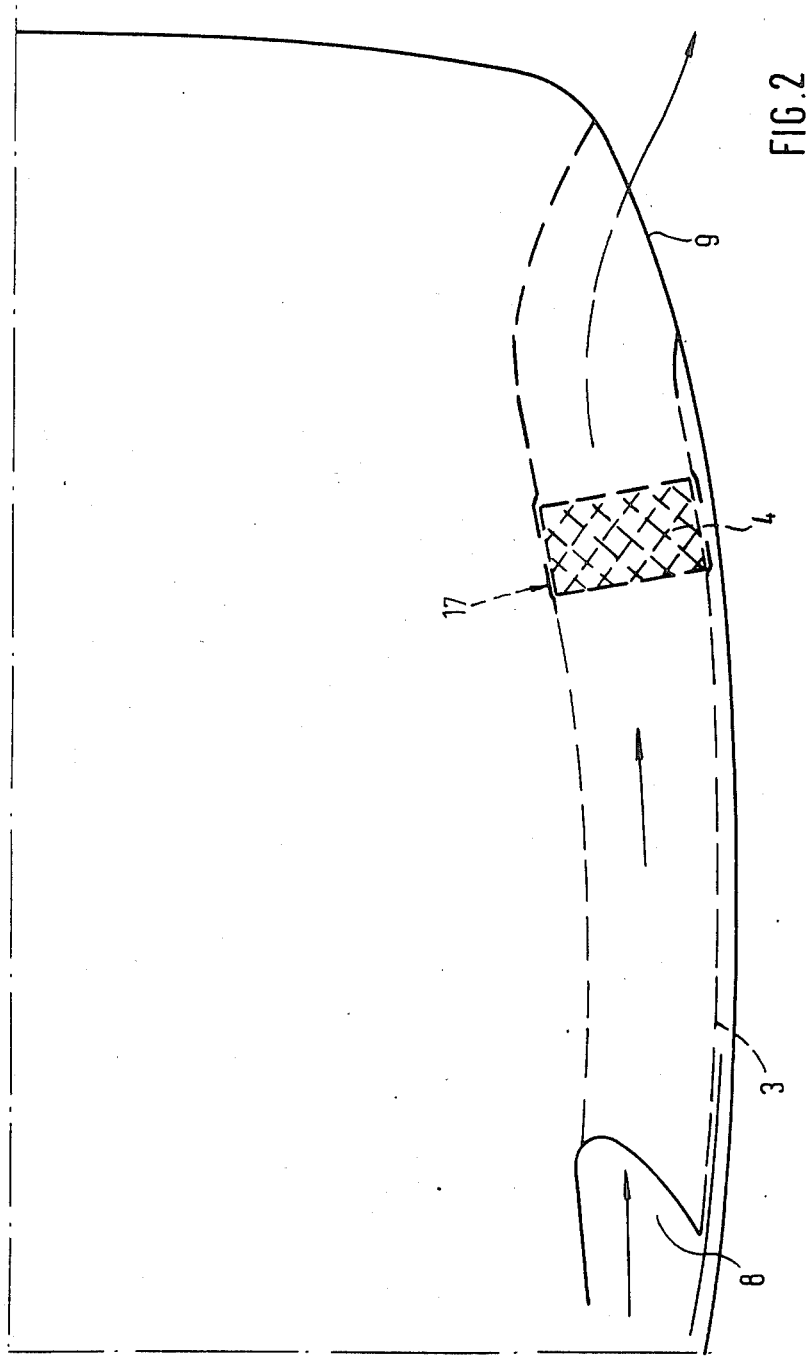

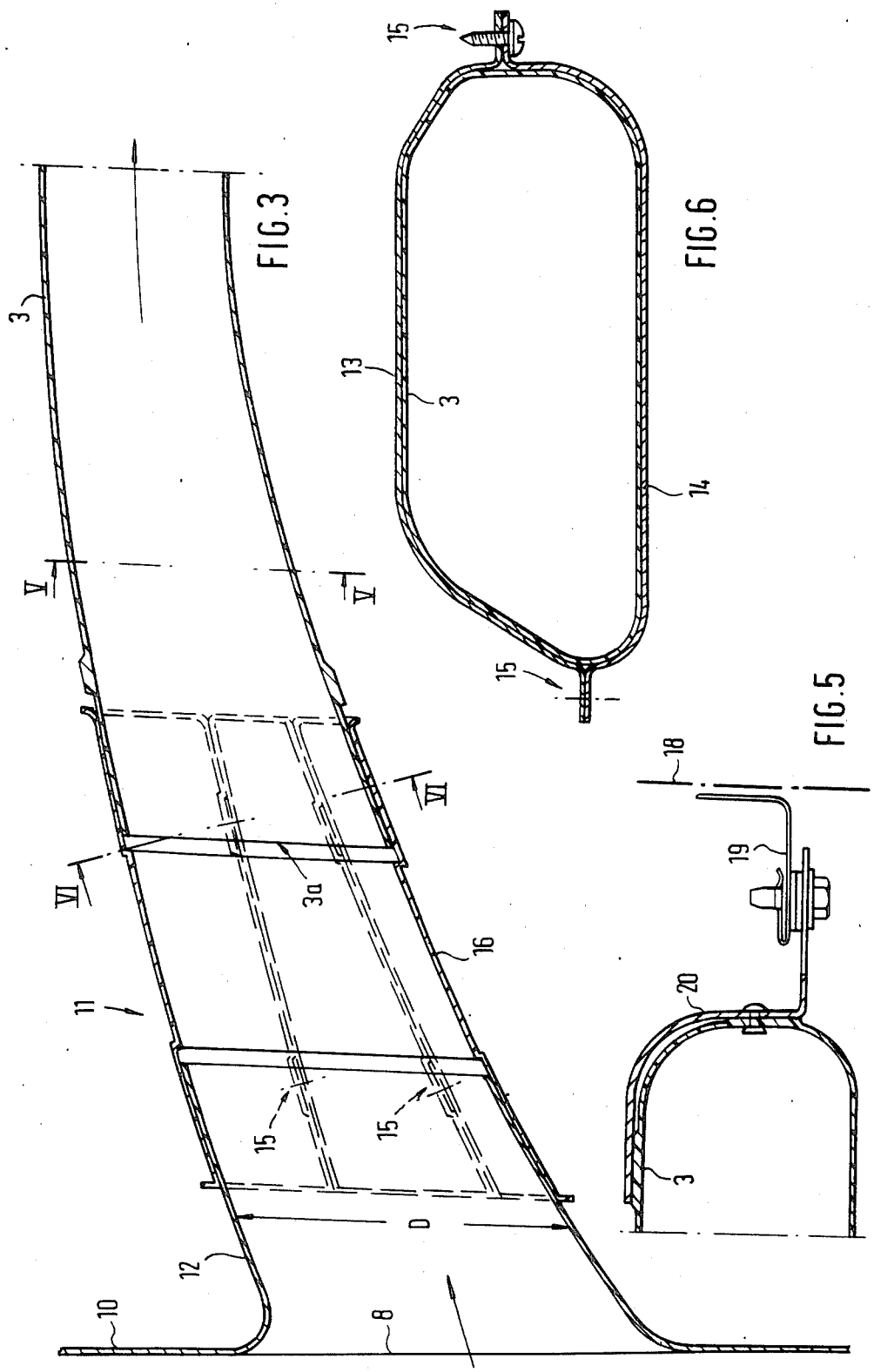

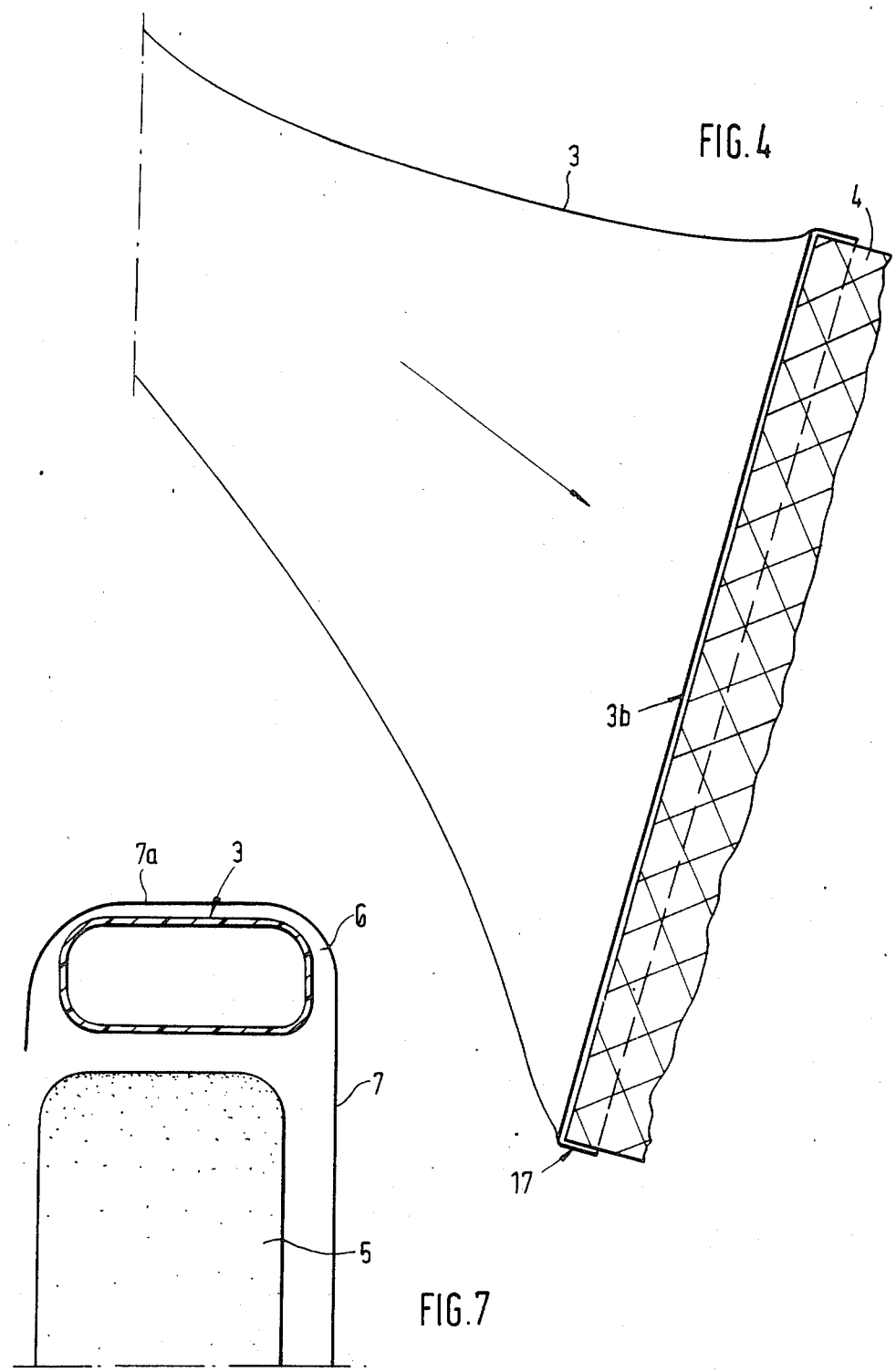

AIR INLET CHANNEL FOR A CHARGING AIR INTERCOOLER

The present invention relates to an air supply channel for a charging air intercoooler of an exhaust gas turbocharger of an internal combustion engine arranged in the rear of a vehicle.

Constructions are known in the prior art (DE-PS No. 605 997 and FR-PS No. 1 150 725) in which air inlet openings are provided in the rear area of a motor vehicle for the supply of cooling air, which provide an inlet for the cooling air into a channel formed by the body and a discharge for the cooling air within the area of the engine space, respectively, discharge through a special opening in the rear end. This channel is part of the body structure of the vehicle and is fixedly and nondetachably integrated into the same, which entails an expensive construction of the body. Furthermore, the engine space in the rear of the vehicle is disadvantageously reduced and limited by the channel formed by the body to such an extent that only an unfavorable space utilization is still possible. Moreover, the accessibility of the intercooler is rendered difficult because the intercooler, like the one according to the German Pat. No. 605,997, is arranged difficult to access. Additionally, a good shielding of the cooling air in the channel against a warm-up by the internal combustion engine is possible only inadequately.

It is the object of the present invention to provide an air supply channel for a charging air intercooler in the rear of a motor vehicle which is easily accessible, simple to install and assures an optimum air feed to the charging air intercooler as well as a discharge of the heated-up air. Additionally, the charging air intercooler is to be capable of being connected in a simple manner with the air supply channel and is to exhibit a good accessibility. Moreover, an optimum shielding against heat radiations is to be made possible.

The underlying problems are solved according to the present invention in that the channel includes a pipe element which is constructed trumpet-shaped and is retained in the wheel casing above the rear wheel and is connected at its air inlet side with an inlet connection fixed at the body by way of a connecting sleeve and at its air discharge side with the charging air intercooler.

The advantages principally adhieved with the present invention reside in that an air supply channel is created which is secured at the body as a separate structural component and does not form a part of the body. The channel is installed subsequently into the wheel casing whereby no space has to be created therefor because the space is already available. A constriction of the engine space is avoided by this arrangement of the channel whereby this channel can be utilized in a favorable manner. The air supply channel is adapted to be installed independently of the engine and is arranged easily accessible. An optimum through-flow rate from the inlet by way of the charging air intercooler to the discharge of the air is assured by a channel contour without significant bends.

Manufacturing tolerances can be compensated by the specially constructed and shaped connecting sleeve which is drawn-in for avoiding flow resistances and whose inner surface extends flush with the inner surface of the inlet connection and of the channel.

For purposes of assembly simplification of the charging air intercooler with the air supply channel, the latter is constructed with an end-face configuration corresponding to the shape of the charging air intercooler so that the charging air intercooler is received fitting into the end-face configuration.

In an advantageous manner, the air inlet opening in the body for the air supply channel is provided within an area in front of the rear wheel and above the rear wheel axis. An excess pressure prevails within this area so that a maximum air supply is assured. The air discharge opening is provided to the rear of the rear wheel approximately at the height of the rear wheel axis within the vehicle rear end area. The air discharge opening is preferably provided in the vacuum zone within the side wall of the body, respectively, partly in the rear area for optimum discharge of the air.

These and other objects, features and advantages of the present invention will become more apparent from the following description when taken in connection with the accompanying drawing which shows, for purposes of illustration only, one embodiment in accordance with the present invention, and wherein:

FIG. 2 is a plan view on FIG. 1 with a schematically illustrated air supply channel without connecting sleeve illustrated in detail;

FIG. 3 is a partial cross-sectional view through the rear area of the air supply channel with connecting sleeve in accordance with the present invention;

FIG. 4 is a partial side elevational view of the forward area of the air supply channel with charging air intercooler in accordance with the present invention;

FIG. 5 is a cross-sectional view through a mounting taken along line V—V of FIG. 3;

FIG. 6 is a cross-sectional view through the air supply channel with connecting sleeve taken along line VI—VI of FIG. 3; and FIG. 7 is a cross-sectional view through the air supply channel within the area of the axis of rotation of the wheel taken along line VII—VII of FIG. 1.

Figure 1:
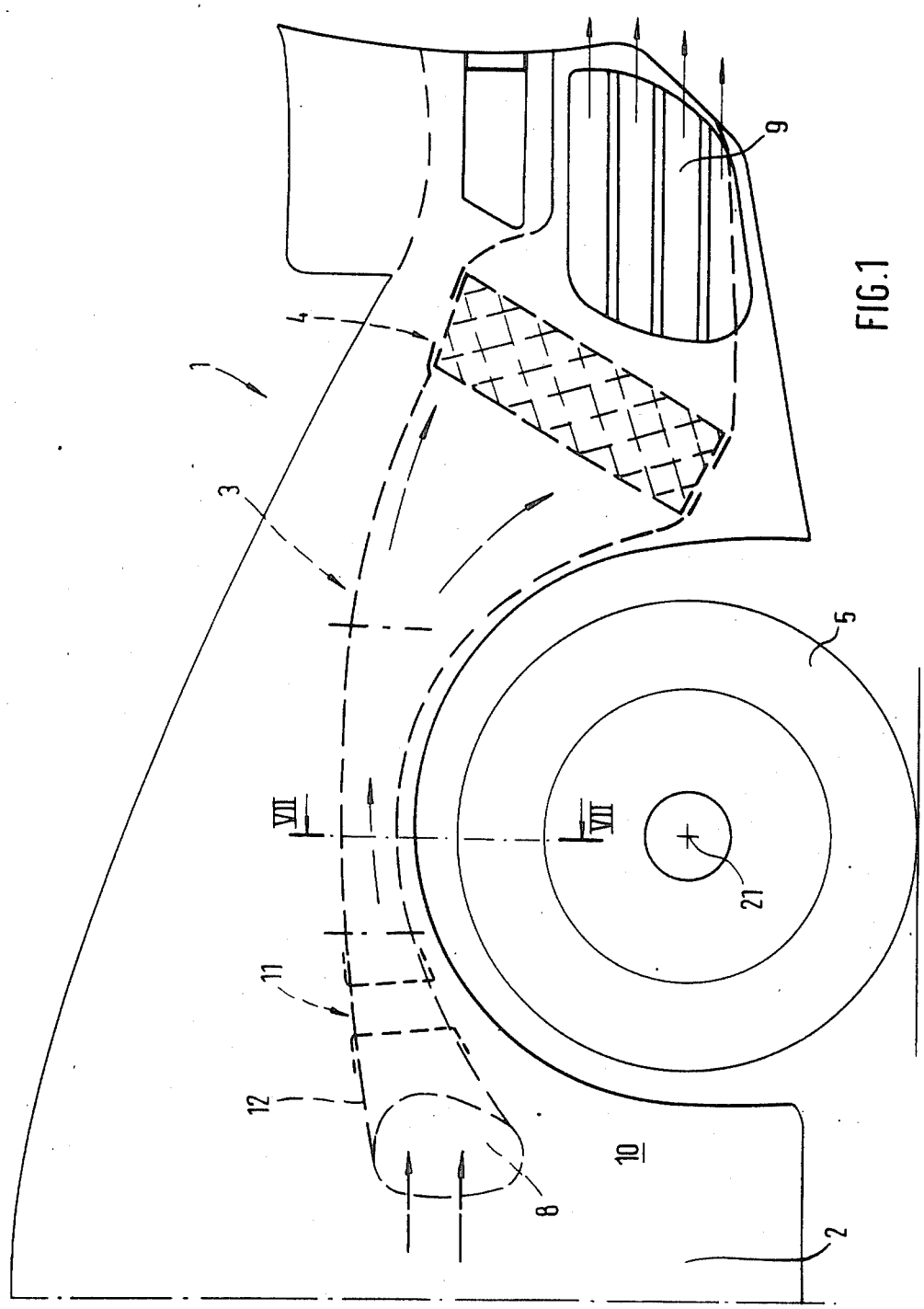
FIG. 1 is a side elevational view of a motor vehicle with a schematically indicating air supply channel, a charging air intercooler and air inlet and discharge openings in accordance with the present invention.

Referring now to the drawing wherein like reference numerals are used throughout the various views to designate like parts, an air supply channel generally designated by reference numeral 3 with a charging air intercooler generally designated by reference numeral 4 is provided in the rear generally designated by reference numeral 1 of a vehicle 2 on each vehicle side. The channel 3 is constructed tubularly shaped of plastic material, such as synthetic resinous material. It extends above a rear wheel 5 within the wheel housing 6 of the body 7 and is preferably constructed in one piece. Air is conducted to the charging air intercooler 4 by way of an outer inlet opening 8 and an outer discharge opening 9 in the side wall 10 and is conducted downstream of the charging air intercooler 4 toward the outside, as indicated more clearly by the arrows in FIG. 1.

The air supply channel 3 is connected at its air inlet side 3a by way of a connecting sleeve 11 with a wall-side inlet connection 12 which forms the external air inlet opening 8. This sleeve 11 includes two half-shells 13 and 14 which connectingly surround the end areas of the inlet connection 12 and of the pipe-shaped air supply channel 3. A clamping fast of the half-shells 13 and 14 takes place by way of a threaded connection 15 (FIG. 6). The sleeve 11 includes a center section 16 which is drawn in corresponding to the inner diameter D of the inlet connection 12 and of the air supply channel 3 and thus an uninterrupted flush inner surface is formed. However, it is also possible, in lieu of the connecting sleeve 11, to connect the air supply channel 3 directly at the inlet connection 12 in such a manner that it is slipped over the inlet connection 12 and is fixed by way of a clamp or the like. Furthermore, it would also be feasible that the connection 12 and the air supply channel 3 include end flanges which are clamped against one another by means of threaded means.

Near the outer air discharge opening 9, the charging air intercooler 4 is connected with the air discharge side 3b of the air supply channel 3. This air discharge side 3b has a rectangularly shaped configuration 17 which retainingly surrounds the intercooler 4, as indicated schematically in FIG. 4.

The charging air intercooler 4 is secured at the body by way of several mountings whereby the air supply channel, as shown more fully in FIG. 5, is also connected with a body wall 18 by way of mounting supports 19 and 20.

The air supply channel 3 is constructed approximately trumpet-shaped and is extended closely along the horizontal wall 7a of the body. The air supply channel 3, owing to its configuration, has a differing cross section, but is constructed essentialy rectangularly shaped as shown in FIG. 6.

The outer air inlet opening 8 is constructed approximately circularly shaped. It is provided—in relation to the driving direction F—ahead of the rear wheel 5 within the drawn-in area of the fender above the axis of rotation 21 of the wheel and preferably within an excess pressure area or zone of the vehicle.

The air discharge opening 9 is arranged—in relation to the drawing direction—to the rear of the rear wheel 5 at the height of the wheel axis of rotation 21. It includes several longitudinal slots arranged one above the other which extend up to the rear end closure wall. Preferably, the air discharge opening 9 is provided within a vacuum zone of the vehicle.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An air supply channel for a charging air intercooler of an exhaust gas turbocharger of an internal combustion engine arranged within the rear of a vehicle having a body means, in which the air channel is arranged within a fender area of the vehicle and comprises air inlet and discharge opening means, the air channel being formed as a separate tubular structural element which is retained in a wheel casing of the body means above the rear wheel, said channel being connected at its inlet side with an inlet connection means fixed at the body means by way of a connecting sleeve means and at its air discharge side with the charging air intercooler.

2. An air supply channel according to claim 1, wherein the tubular element is constructed in one piece and consists of plastic material.

3. An air supply channel according to claim 2, wherein the connecting sleeve means includes two half-shells having connecting flanges, each half-shell connectingly surrounding an end area of the inlet connection means and of the channel.

4. An air supply channel according to claim 3, wherein a center portion of the half-shells is drawn-in and has an inner surface extending substantially uninterruptedly from the inlet connecting means to the channel with a similar diameter.

5. An air supply channel according to claim 4, wherein the tubular element is provided at its air discharge side with a substantially rectangularly shaped configuration constituting a mounting means for receiving the charging air intercooler.

6. An air supply channel according to claim 5, wherein the tubular element includes several mounting support means which are connected with a wall of the body means of the vehicle.

7. An air supply channel according to claim 6, wherein the connecting means includes an outer air inlet opening means in a side wall of the vehicle body means which is constructed approximately circularly shaped and is arranged in front of the rear wheel within the drawn-in area of the fender above the axis of rotation of the wheel, as viewed in the driving direction of the vehicle.

8. An air supply channel according to claim 7, wherein the outer discharge opening means of the channel—in relation to the driving direction—is arranged to the rear of the rear wheel in the side wall of the vehicle body means and approximately at the height of the axis of rotation of the wheel, said discharge opening means including several longitudinal slots arranged one above the other which are located in a triangularly shaped body opening.

9. An air supply channel according to claim 1, wherein the connecting sleeve means includes two half-shells having connecting flanges, each half-shell connectingly surrounding an end area of the inlet connection means and of the channel.

10. An air supply channel according to claim 9, wherein a center portion of the half-shells is drawn-in and has an inner surface extending substantially uninterruptedly from the inlet connecting means to the channel with a similar diameter.

11. An air supply channel according to claim 1, wherein the tubular element is provided at its air discharge side with a substantially rectangularly shaped configuration constituting a mounting means for receiving the charging air intercooler.

12. An air supply channel according to claim 1, wherein the tubular element includes several mounting support means which are connected with a wall of the body means of the vehicle.

13. An air supply channel according to claim 1, wherein the connecting means includes an outer air inlet opening means in a side wall of the vehicle body means which is constructed approximately circularly shaped and is arranged in front of the rear wheel within the drawn-in area of the fender above the axis of rotation of the wheel, as viewed in the driving direction of the vehicle.

14. An air supply channel according to claim 1, wherein the outer discharge opening means of the channel—in relation to the driving direction—is arranged to the rear of the rear wheel in the side wall of the vehicle body means and approximately at the height of the axis of rotation of the wheel, said discharge opening means including several longitudinal slots arranged one above the other which are located in a triangularly shaped body opening.

15. An air supply channel according to claim 1, wherein the separate tubular structural element is substantially trumpet shaped with a larger circumferential area at the discharge end of the air supply channel than at the inlet end.

* * * * *